B. F. HUTCHES, Jr.
TYPE WRITING MACHINE.
APPLICATION FILED FEB. 23, 1911.
1,062,009.
Patented May 20, 1913.
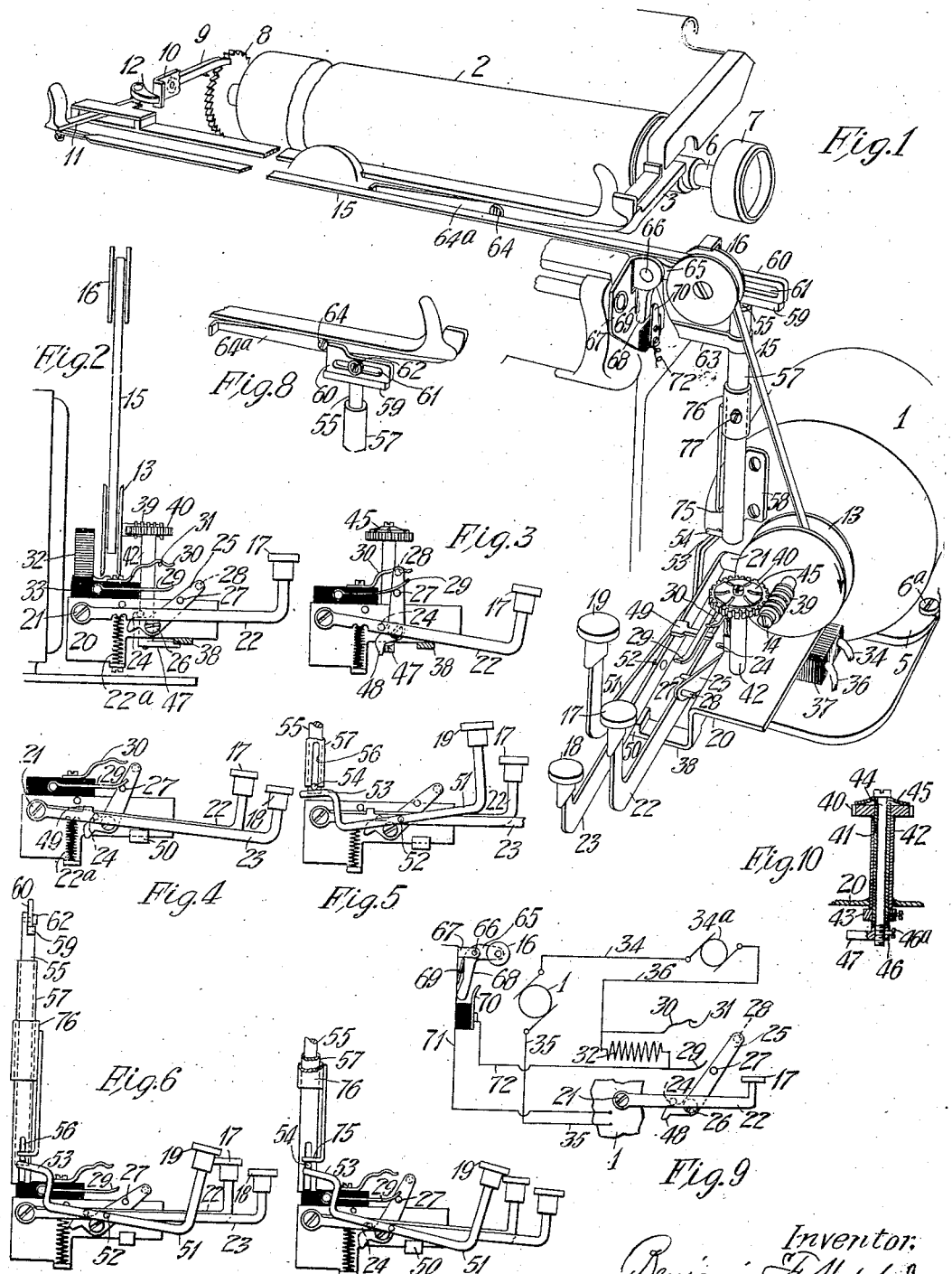
Witnesses
F. E. Alexander
C. B. Pitblado
Inventor:
Benjamin F. Hutches
By C. C. Stickney
Attorney.

UNITED STATES PATENT OFFICE.

BENJAMIN F. HUTCHES, JR., OF ALLENDALE, NEW JERSEY, ASSIGNOR TO UNDERWOOD TYPEWRITER COMPANY, OF NEW YORK, N. Y., A CORPORATION OF DELAWARE.

TYPE-WRITING MACHINE.

1,062,009.

Specification of Letters Patent.    Patented May 20, 1913.

Application filed February 23, 1911. Serial No. 610,145.

*To all whom it may concern:*

Be it known that I, BENJAMIN F. HUTCHES, Jr., a citizen of the United States, residing in Allendale, in the county of Bergen and State of New Jersey, have invented certain new and useful Improvements in Type-Writing Machines, of which the following is a specification.

The present invention relates to that class of typewriting machines in which the carrier return and line spacing operations are effected by power actuated means suitably controlled from the keyboard or elsewhere.

It is an object of the present invention to provide means whereby power may be applied to cause the carriage to be returned at high speed, without shock to the mechanism, whenever the distance through which the return is to be effected warrants a high speed return. In this connection it is an object of the invention to return the carriage with considerable power and speed, and to cut off the power after a predetermined movement of the carriage, less than the complete return movement; the momentum of the carriage accruing before the cut off to be sufficient to complete the carriage return and being substantially exhausted in so doing, so that the carriage is arrested without appreciable shock.

It is an object of the invention to provide, in conjunction with one another, the aforesaid high-speed return and power control means, to be employed when long lines of substantially uniform length are written; and a means whereby there may be a slow power return of the carriage with no cut-off of the power until the starting point is reached, when lines of short and varying length are written.

It is an object of the invention to provide key controlled means whereby the carriage may be returned by power at different speeds according to return distance.

It is an object of the invention to provide means for starting the carriage by power at low speed, and for causing the speed of the power drive to be thereafter accelerated or increased. It is an object to provide means whereby the speed of operation, or power of the motor, which returns the carriage, is increased from a low starting speed to a higher speed.

It is an object of the invention to provide means for returning the carriage by power to a selected starting position other than the normal starting position, as for instance, in indenting for a paragraph. This feature of the invention comprises a key controlled means for setting a marginal stop in the path of the carriage and for applying the power to drive the carriage to the stop when the latter is set, the stop being withdrawn again when the key, which controls it, is released.

In the preferred form of the invention, the motive power is derived from an electric motor; the motor is controlled as to its operation by a number of keys; the speed of the motor is regulated by the circuit resistance of the motor, and the latter in turn is controlled by the keys, so that, according to whatever is operated, the resistance in the motor circuit will be greater or less, and the drive of the carriage accordingly determined; the cut-out of the motor in returning at high speed from long lines is automatically effected preferably after a certain number of revolutions of a shaft driven by the motor, and the time operation of the motor, or distance of travel of the carriage before the cut-out is effected, may be regulated to the length of the line or to the speed of the return, so that the momentum will be sufficient to complete the return, but will not be excessive.

Other objects and features of the invention will hereinafter appear.

In the accompanying drawings, Figure 1 is a view in perspective showing the motor and associated parts attached to the typewriter frame and operatively connected to the carriage. Fig. 2 is a view in side elevation showing in normal position the long line motor control key and associated parts. Fig. 3 is a view in side elevation showing the long line key depressed, and the connections established to return the carriage. Fig. 4 is a view in side elevation, showing both the long and the short line keys, and associated parts, in the position assumed when the short line key is depressed, to return the carriage. Fig. 5 is a view in side elevation showing the marginal control key and associated parts, as well as the other keys, all in normal position. Fig. 6 is a view in side elevation, showing the marginal key depressed sufficiently to elevate the stop plunger controlled thereby, but insufficiently depressed to actuate the other keys to establish the motor circuit. Fig. 7 is a view similar to Fig. 6, except that the marginal key is fully depressed. Fig. 8 is a detail perspective view of the carriage stop controlled by the marginal key, the same being shown in set position with respect to a fixed stop on the carriage. Fig. 9 is a diagrammatic view of the circuit connections. Fig. 10 is a detail view of the device for cutting out the motor after a predetermined drive of the same.

The motor 1 for line-spacing the platen 2, and for returning the carriage 3, is attached to the typewriter in any suitable manner as by means of a bracket such as 5, and bolts 6ª. The platen shaft 6, having the platen 2, the hand wheel 7 and the line-spacing wheel 8 fast thereto, is shown mounted in the carriage. Coöperating with the line-spacing wheel 8 is the dog 9 carried on the slide 10 and operated by the line-spacing lever 11, which is a bell crank pivoted at 12 to the carriage frame. The lever 11 is connected to a drum 13, fast on the motor shaft 14, by means of a draw band 15, one end of which is connected to the lever 11 and the other end of which is attached to the drum. The draw band is guided at an intermediate point by an idler 16 secured to the typewriter frame at the upper right hand corner thereof. When therefore the motor circuit is closed, and the motor shaft turned clockwise with the drum 13, there is a pull on the band, which first effects a line-spacing movement of the lever 11, and then draws the carriage to the right.

There are shown several keys for controlling the motor. One of these, key 17, herein referred to as the "long line" key, is a key to be operated to return the carriage after the writing of a full line. The depression of the long line key causes the motor to operate at a relatively high speed for a predetermined period, or until the carriage reaches a predetermined point in its throw, whereupon the circuit is broken and the throw of the carriage is completed by virtue of its own momentum. Another of the keys, key 18, herein referred to as the "short line" key, is a key to be operated to cause the motor to drive the carriage at a relatively slow speed all the way to the starting point from any point of the line, or to line space merely. A third key 19, denominated the "marginal" key, is employed to effect the return of the carriage from any point of the line to a predetermined but adjustable marginal or indented position. Each of the keys, when operated, causes the motor circuit to be closed and the motor to operate. Marginal key 19, in addition to closing the motor circuit, sets a stop for arresting the carriage before its normal or ordinary full throw is completed. Key 17, the long line key, causes the carriage to be thrown with considerably more power and at greater speed than when the short line key 18 is operated. The throw to be effected by key 17 is a long throw, the length of which may be fixed, wherefore the carriage may be driven at high speed for a considerable and predetermined distance, and thereafter be slowed down before the carriage stops are reached to avoid severe shock in arresting the carriage. On the other hand, the throw to be effected by operation of the key 18, may be but short, and may vary with different lines; so that in such instances, to prevent injury to the machine in stopping the carriage, the motor is caused to operate with less speed and power than when the long line key 17 is employed; and in the absence of the momentum sufficient to complete the throw of the carriage, the action of the motor may be continued by the short line key until the carriage stops are reached, the speed of the throw at such times being insufficient to cause injury to the mechanism. The difference in the power of the motor in the two instances is preferably regulated by means of electrical resistance, included in the motor circuit when the short line key is operated, but which is shunted or otherwise eliminated or reduced when the long line key is operated. When the marginal key 19 is operated, the resistance is also preferably included in the circuit, for the reason that the return throw of the carriage to the indented or marginal position may be a short throw.

Screwed or otherwise attached to the motor casting, and in metallic contact therewith, is a plate 20 which serves as a base plate or support for the several keys and other parts of the motor control mechanism. A fixed, horizontally disposed stud or pin 21, mounted in a vertical wall formed by the plate 20, serves as a pivot for the levers 22 and 23 which carry the keys 17 and 18 respectively. The key levers 22 and 23 have independent bearings on the pin 21, so as to be movable independently one of the other. The lever 22 carries a laterally projecting pin or projection 24 adapted, when lever 22 is depressed, to engage one arm of a trip lever 25 pivoted at 26 to the vertical wall of plate 20, and to rock the lever 25 counter-clockwise on its pivot when it so engages the same. The lever 25 carries two pins or projections 27 and 28, adapted to coöperate with electrical contact strips or springs 29 and 30 respectively. A relatively small movement of the lever 25 from normal position suffices to bring pin 27 into engagement with contact spring 29. A greater movement of lever 25 is however necessary to bring pin 28 into engagement with contact spring 30. The first effect therefore, of depressing key 17 is to cause pin 27 to engage contact 29. Thereafter, as the depression of key 17 proceeds, the pin 27 remains in contact with spring 29 until pin 28 finally engages contact spring 30. Contact 30 yields upward under the pressure of pin 28, and is shaped to receive pin 28 in a pocket 31, thus acting as a spring detent to hold the lever 25 after the key 17 has been released. A coil spring 22ª bearing on the under side of the key lever 22 and on the base plate, serves to return the key 17 to normal position upon release of the key.

When the depression of key 17 has proceeded far enough to bring pin 27 into contact with spring 29, a circuit is closed through the motor, and motor shaft 14 commences to revolve with the drum. At this time however, the circuit includes a resistance coil 32 mounted on a block 33 of insulating material in turn mounted upon and attached to the base plate 20. When the movement of the key 17 has progressed far enough to cause pin 28 to engage the contact spring 30, a shunt is closed around the resistance coil 32, short circuiting the latter, and causing the motor to operate with more power.

The circuits thus far described are shown diagrammatically in Fig. 9. The feed wire 34, from a suitable source of electricity, such as generator 34ª, is shown as connected to the motor 1. The circuit continues thence through the motor, and from the motor leads, by means of a wire 35, to the motor casting, thence to the plate 20 which is in metallic contact with the motor casting, thence through bearing pin 21 to key lever 22, pin 24, and lever 25; whence, if lever 25 is depressed only sufficiently to cause pin 27 to engage contact 29, the circuit is continued by way of pin 27, contact spring 29, resistance coil 32, and back to the source by the other feed wire 36. If however key 17 is depressed far enough to bring pin 28 to contact 31, then the circuit is continued from lever 25 by pin 28 and contact 31 to wire 36, thus shunting the resistance coil 32.

The feed wires 34 and 36 are preferably connected with the motor at suitable terminals on a block 37 of insulating material secured to the under side of the plate 20. The spring contacts 29 and 30 are preferably secured to the block 33 which is on top of the plate 20. The contact 29 is connected at the block 33 with one terminal of the resistance coil, and an extension of the feed wire 36 leads up through the plate 20 and block 33 to the other terminal of the coil 32 and to the contact 30.

From the above it will appear that when the long line key 17 is operated, the motor is started at low speed, with the current passing through the resistance 32, and that thereafter the speed of the motor is increased by a cutting-out of this resistance, before the key lever stroke is terminated by a stop arm 38 on the plate 20. The slow start of the motor permits of a smooth starting of the carriage, and thus the mechanism is saved from shocks to which it might otherwise be subjected. The speed of the motor and of the carriage is presently increased by key 17 to such an extent as to make it of importance to reduce the momentum of the carriage near the end of its throw to protect the machine from the shocks which would otherwise be incurred in stopping the carriage. This reduction of momentum is herein effected by breaking the motor circuit, after a predetermined travel or throw of the carriage and before the latter reaches the stops, the momentum acquired before the circuit is broken being relied upon to complete the throw of the carriage and being substantially exhausted in so doing.

The breaking of the motor circuit is effected by disengaging the lever 25 from the pocket 31 in the contact spring 30, after the key 17 is released; and, to this end, the following means is provided. On the motor shaft 14 is a worm 39 engaging a gear 40 fast on a sleeve 41. Sleeve 41 is loosely fitted and adapted to turn within a tube 42 fixed in the plate 20 and passing through the latter. The upper end of the tube 42 serves as a bearing for the under face of the gear 40; and the sleeve 41 to which the gear is fast passes entirely through tube 42 and projects beyond the lower end thereof. A collar 43 on the lower end of the sleeve 41, by engagement with the end of the tube 42, prevents longitudinal movement of the sleeve in the tube. The gear 40 with the sleeve 41 therefore turns within the tube 42 whenever the worm on the motor shaft turns. The turning movement of the gear 40 is transmitted to a shaft 44 which passes through both the sleeve 41 and the gear 40; and this transmission is effected by means of a spring disk 45 which is fast to the upper end of shaft 44 and which bears upon the upper face of the gear 40. The shaft 44 at its lower end has threaded on to it a collar 46 which may be screwed up against the lower end of sleeve 41, or against the collar 43 fast thereto, thus drawing the disk spring 45 down against the gear 40 with any desired tension. A set screw 46ª holds the collar 46 in any adjusted position of the same. Neither the gear 40 nor the sleeve 41 has any connection to the shaft 44 save such as is provided by the friction due to the pressure of the disk spring 45 on the gear 40. The collar 46 on the shaft 44 carries a horizontally disposed arm 47 set at an angle such that after a greater or less clockwise movement of the shaft 44, the arm 47 strikes a shoulder 48 on the lever 25, throwing the latter down and out of engagement with the contact spring 30. The circuit of the motor is thereupon broken, and the carriage completes its throw by virtue of its own momentum. The lever 25 is preferably free to be swung by the arm 47 out of the path of the latter, so that the arm 47 may complete its revolution and automatically position itself for the next carriage return movement. After the cut-out of the motor, it is the momentum of the carriage acting through the drawband which turns shaft 44 sufficiently to bring the arm 47 to initial position. If, because the key 17 is being held depressed, or for any other reason, the lever 25 cannot be thrown by the arm 47, the obstruction thus offered to the arm 47 will cause the disk spring 45 to slip on the gear 40, and no harm will be done the mechanism.

It is obvious that, according to the length of the arc through which the arm 47 must move before striking the trip lever 25, the time of motor drive will be greater or less. Therefore by adjusting the shaft 44, or the angular position of the arm 47 thereon, the motor drive may be regulated for any desired length of line. In the structure shown, the regulation may be readily accomplished, without affecting the tension of the spring 45 on the gear 40, by inserting a screw driver in a slot in the head of the shaft 44 and turning the shaft to the desired angular position, the gear 40 being held by worm 39 against corresponding rotation during this operation. The spring 45 will hold the gear 40 and shaft 44 in any adjusted relative position.

The key 17 is not used to return the carriage after short lines are written, because, if the trip arm 47 does not operate to cut out the motor until after a predetermined number of revolutions of the motor shaft, the carriage, if returned by key 17 after a short line, would strike the carriage stops at high speed before the motor was cut out. On the other hand if the trip to cut out the motor is arranged to act when the carriage reaches a certain point of its throw, regardless of the number of revolutions of the motor shaft, then it would happen, in event of the use of key 17 for short lines, that the cut out would occur before the carriage had acquired the momentum sufficient to return it to starting position after the motor had stopped. Consequently, key 18 is used for the short lines.

The lever 23 of key 18, while pivoted on bearing pin 21 independently of key 17, nevertheless when actuated effects a limited movement of the long line key. Key lever 23 carries an arm or projection 49 which extends across and over key lever 22 (see Fig. 1) in such manner that the depression of key 18 must cause depression of key 17, although, conversely, key 17 may be operated without moving key 18. A lug 50 on the end of stop arm 38 serves as a stop for key 18. The lug 50 is sufficiently higher than the arm 38 to render impossible a complete depression of key 17 by key 18. Key 17, when moved by means of key 18, rocks trip lever 25 with contacts 27 and 28, but the movement of the key 17 and lever 25 in such instances is only sufficient to bring the contact 27 to the spring 29; contact 28 cannot reach spring 30 because of the stop 50. The motor circuit is therefore established through the resistance coil 32 and continues to include this coil during the carriage drive. The lever 25 is not held by spring 29 as it is by spring 30, and therefore the circuit remains closed only so long as key 18 is held depressed. Owing to the slow speed of the carriage, due to the resistance 32 in the motor circuit, the key 18 may be held depressed until the carriage reaches its stops. Since the lever 25 on contact 29 is not held when key 18 is released, the trip arm 47, actuated by the worm and gear, has no function; which was to be expected since there is no high speed or momentum necessary to be reduced in the return from short lines. Key 18 is returned to normal position by the spring 22$^a$ acting through the lever 22 and cross arm 49.

The marginal key 19 for returning the carriage to some special marginal or indented starting position, is shown as carried by a key lever 51 pivoted at 52 on the lever arm 23 of the short line key. At its inner end 53 the key lever 51 engages a pin 54 which is fast to a stop-carrying plunger 55 and projects through and moves in a slot 56 in the plunger cylinder 57 when the plunger is moved up and down in its cylinder. Cylinder 57 is supported at its lower end by a bracket 58 screwed to the motor casting, and at its upper end is firmly secured to the main frame of the typewriter by means of an arm 63. The plunger is sufficiently loose in the cylinder to permit it to drop by gravity to the lower end of its path of movement; and the weight of the plunger is such that by reason of the engagement of the pin 53 with the marginal key lever the latter is returned to normal position after each operation. The upper end of the slot 56 may serve as a stop for the pin 53 to determine the stroke of the plunger, or an adjustable stop 75 carried by a sleeve 76 secured to the cylinder by means of a set screw 77 may be employed for this purpose. The plunger carries at its upper end a cross piece or block 59 which serves as a support and alining means for the marginal carriage-stop 60. The carriage stop 60 is adjustable on the plunger in the direction of carriage movement so that the stopping position of the carriage may be adjusted within considerable limits. A horizontal slot 61 in the marginal stop and a headed set screw 62 carried by the plunger within this slot provides for the adjustable attachment of the stop to the plunger. The long bearing of the plunger in the cylinder, and the attachments of the latter to motor casting and to the typewriter frame enable the marginal stop to resist the shocks of the returning carriage.

Whenever the lever 51 of the key 19 is depressed, it is first rocked around its pivot 52, lifting the plunger 55 with the stop 60 to bring the latter into the path of a fixed stop 64 on the carriage, which stop is shown as the pivot screw of the marginal release lever 64$^a$. This movement is terminated by the engagement of the stop pin 54 with the upper end wall of the slot 56. The point of engagement of the pin 54 with the lever 51 then becomes the fulcrum of the lever 51, and further depression of key 19 results in depression of short line key lever 23 to which lever 51 is pivotally attached at 52. Short line key lever 23 in being thus depressed by key 19 must carry with it the long line key lever 22, because of the cross arm 49. The three key levers therefore are all depressed together by the key 19 until the short line key lever 23 finally strikes the stop 50. The motor circuit is established through the long line key lever 22 and contacts 27 and 29 in the same manner as when key 18 is operated for short lines. The stop 50 prevents the lever 25 from moving far enough to cut out the resistance coil 32, and so the carriage is driven at the same moderate rate to the marginal stop as when driven to the normal starting point upon operation of the short line key 18. The slow return to the marginal stop is desirable because the return thereto may be from short lines as well as from long lines, and provision must be made accordingly.

Provision is made for taking up the slack in the draw band in event the carriage is returned by hand, so as to prevent the band from falling off of the drum and becoming entangled in the mechanism. When the carriage is returned by hand a circuit is established through the motor, causing the latter to be driven with the drum 13 at a speed sufficient to take up the slack in the band. This motor circuit is controlled by the pulley or idler 16 over which the draw band is guided. Idler 16 is mounted on one arm 65 of a bell crank lever pivoted at 66 to a bracket 67 fast to the typewriter frame. The other arm 68 of this bell crank lever is adapted to bear at its end against the bracket 67 and thus defines the position of the lever and of the idler when the draw band is taut and is exerting a downward pressure on the idler. There is however a spring 69 between the bracket 67 and the lever arm 68 bearing against the latter, and tending to rock the bell crank counterclockwise around its pivot 66. So long as the draw band is taut, it holds the bell crank against the action of the spring 69. As soon however as the draw band becomes slack, the spring 69 acts to throw the bell crank, and in so doing throws the arm 68 thereof against an electrical contact strip 70, establishing a circuit through the motor and causing the latter to start to take up the slack. Referring to Fig. 9 this circuit may be traced as follows: feed wire 34, motor 1, line 35, motor casting, typewriter frame (which is metallically connected to motor casting as indicated by line 71) bracket 67, lever arm 68, contact 70, wire 72, resistance coil 32, and feed wire 36. The resistance coil is thus seen to be in this circuit, insuring moderate speed for the motor during the slack take-up. As soon as the draw band becomes taut again, the bell crank carrying the idler 16 is rocked to break the motor circuit at the contact 70, and the motor is stopped.

Having thus described my invention, I claim:

1. In a typewriting machine, the combination of a carriage, a motor, connections from the motor to the carriage for returning the latter to starting position, and key-controlled means for driving the motor at different speeds by varying the torque with which it turns.

2. In a typewriting machine, the combination of a carriage, an electrical motor, connections from the motor to the carriage for returning the latter to starting position, and key-controlled means for varying the current driving the motor to drive it at different speeds.

3. In a typewriting machine, the combination of a carriage, an electrical motor, connections from the motor to the carriage for returning the latter to starting position, a source of electricity in circuit with the motor for driving the same, and key-controlled means for varying the resistance of the circuit.

4. In a typewriting machine, the combination of a carriage, an electrical motor, connections from the motor to the carriage for returning the latter to starting position, a source of electricity in circuit with the motor for driving the same, a resistance adapted to be included in the circuit, a key for closing the circuit with the resistance included therein to cause the motor to be driven at one speed, and a second key for closing the circuit without said resistance to cause the motor to be driven at a higher speed.

5. In a typewriting machine, the combination of a carriage, an electrical motor, connections from the motor to the carriage for returning the latter to starting position, a source of electricity in circuit with the motor for driving the same, a resistance adapted to be included in the circuit, a key for closing the circuit with the resistance included therein to cause the motor to be driven at one speed, a second key for closing the circuit without said resistance to cause the motor to be driven at a higher speed, and means for automatically stopping the motor after a predetermined length of drive of the same at the higher speed.

6. In a typewriting machine, the combination of a carriage, a motor, connections from the motor to the carriage for returning the latter to starting position, means for actuating said connections from the motor at a speed produced by one torque for short returns of the carriage, and means for actuating said connections from the motor at a torque producing higher speeds for long returns of the carriage.

7. In a typewriting machine, the combination of a carriage, a motor, connections from the motor to the carriage for returning the latter, a cut-out device for the motor, a worm driven by the motor, a gear meshing with the worm, a shaft carrying the gear, and means connected to the shaft adapted to operate the motor cut-out device after a predetermined movement of said gear.

8. In a typewriting machine, the combination of a carriage, a motor, connections from the motor to the carriage for returning the latter, speed reduction gearing driven by the motor, and a cut-out device for the motor actuated by said reduction gearing after a predetermined operation of the motor.

9. In a typewriting machine, the combination of a carriage, a motor, connections from the motor to the carriage for returning the latter, a shaft driven by the motor, a worm on said shaft, a gear meshing with said worm, a shaft driven by said gear, a lever actuated by said last named shaft, and a cut-out device for the motor adapted to be actuated by said lever after a predetermined operation of said motor.

10. In a typewriting machine, the combination of a carriage, an electrical motor, connections from the motor to the carriage for returning the latter, a key controlled switch for closing the circuit of the motor to return the carriage, means for holding the switch in circuit-closing position, and means actuated from the motor independently of the carriage for throwing the switch to break the motor circuit after a predetermined operation of the motor.

11. In a typewriting machine, the combination of a carriage, an electrical motor, connections from the motor to the carriage for returning the latter, a key controlled switch for closing the circuit of the motor to return the carriage, means for holding the switch in circuit-closing position, a trip lever for positively throwing the switch to break the circuit, and speed reduction gearing driven by the motor to move the trip lever to throw the switch after a predetermined movement of the motor.

12. In a typewriting machine, the combination of a carriage, an electrical motor, connections from the motor to the carriage for returning the carriage, a resistance device, a contact for closing the motor circuit with the resistance included therein, a branch circuit around said resistance, a second contact for closing said branch circuit to shunt said resistance, and key controlled means adapted upon movement thereof to engage said first named contact to close the motor circuit with the resistance included therein and upon further movement thereof adapted to engage said second named contact to close the shunt around said resistance.

13. In a typewriting machine, the combination of a carriage, an electrical motor, connections from the motor to the carriage for returning the carriage, a resistance device, a contact for closing the motor circuit with the resistance included therein, a branch circuit around said resistance, a second contact for closing said branch circuit to shunt said resistance, key controlled means adapted upon movement thereof to engage said first named contact to close the motor circuit with the resistance included therein and upon further movement thereof adapted to engage said second named contact to close the shunt around said resistance, a second key, and means controlled by said second key for actuating the contact closing connections of said first key sufficiently to cause the same to close the motor circuit with the resistance included therein, but insufficiently to permit said resistance to be shunted.

14. In a typewriting machine, the combination of a carriage, an electrical motor, connections from the motor to the carriage for returning the carriage, and key controlled means for closing the motor with a resistance therein to start the motor at one speed and for thereafter reducing said resistance to drive the motor at a higher speed.

15. In a typewriting machine, the combination of a carriage, a motor, connections from the motor to the carriage for returning the carriage, a stop adapted to be moved into the path of the carriage to arrest the carriage at a predetermined point on its return, and key controlled means for starting the drive of the carriers by the motor and for setting said stop to arrest the carriage.

16. In a typewriting machine, the combination of a carriage, a motor, connections from the motor to the carriage for returning the carriage, a stop adapted to be moved into the path of the carriage to arrest the carriage at a predetermined point, a key controlled lever for setting said stop, and means controlled by said lever for closing the motor circuit to cause the motor to drive the carriage to said stop.

17. In a typewriting machine, the combination of a carriage, a motor, connections from the motor to the carriage for returning the latter, a key, and means controlled by said key for varying the torque to cause the carriage to be driven at slow speed upon part movement of said key, and to be driven at a higher speed upon greater movement of said key.

18. In a typewriting machine, the combination of a carriage, a motor, connections from the motor to the carriage for returning the latter, a key, means controlled by said key for causing the carriage to be driven at slow speed upon part movement of said key, and to be driven at a higher speed upon greater movement of said key, and a second key for effecting said part movement only of said first key.

19. In a typewriting machine, the combination of a carriage, a motor, connections from the motor to the carriage for returning the latter, a key, means controlled by said key for causing the carriage to be driven at slow speed upon part movement of said key, and to be driven at a higher speed upon greater movement of said key, a second key having a cross arm extending over said first key and adapted to engage and depress said first key when said second key is operated, and a stop for said second key positioned to arrest the same after movement thereof with the first key sufficient to cause slow drive of the carriage, but before the first key has moved far enough to cause faster drive of the carriage.

20. In a typewriting machine, the combination of a carriage, a motor, connections from the motor to the carriage for returning the latter, a key, means controlled by said key for causing the carriage to be driven at slow speed upon part movement of said key, and to be driven at a higher speed upon greater movement of said key, a second key for effecting said part movement only of said first key, a third key having a connection to said second key whereby the latter may be operated from the third key, a stop adapted to be moved into the path of the carriage, and means controlled by the third key for setting said stop.

21. In a typewriting machine, the combination of a carriage, a motor, connections from the motor to the carriage for returning the carriage, and key controlled means for starting the motor at one speed and for thereafter increasing the torque to increase the speed of the motor.

22. In a typewriting machine, the combination with a carriage, of a motor for returning it at high speed, means to cause the motor to run at a reduced speed, a belt connecting said carriage and said motor, and mechanism for bringing said speed-reducing means into operation and turning said motor at a low speed to take up slack in said belt.

23. In a typewriting machine, the combination of a carriage, a motor, connections between the motor and the carriage for returning the latter to starting position, and means to vary the torque of the motor and thereby control its speed.

24. In a typewriting machine, the combination of a carriage, a motor, driving connections between the motor and carriage for returning the latter to starting position, resistance in the motor circuit, and means to cut out said resistance from the motor circuit and thereby vary the torque and speed of the motor.

25. In a typewriting machine, the combination of a carriage, a motor, means for forming a positive driving connection between the carriage and motor, a key controlling the motor circuit, and means controlled by said key to vary the torque of the motor and thereby control its speed.

26. In a typewriting machine, the combination of a carriage, a motor, connections between the motor and carriage, and a key operable when partly depressed to establish a circuit for the motor and when further depressed to modify the motor circuit and thereby effect an increase in speed of the motor.

27. In a typewriting machine, the combination of a carriage, a motor, connections from the motor to the carriage for returning the latter to starting position, and a key operable when partly depressed to establish a circuit for the motor and cause the latter to run at slow speed and when fully depressed to cause the motor to accelerate to full speed.

28. In a typewriting machine, the combination of a carriage, a motor, connections from the motor to the carriage for returning the latter to starting position, a key operable when partly depressed to establish a circuit for the motor and when fully depressed to increase the torque of the motor and thereby increase its speed, and means to maintain the motor at said increased speed after the key is released.

29. In a typewriting machine, the combination of a carriage, an electric motor, driving connections from the motor to the carriage for returning the carriage to starting position, a finger-key, a circuit-controlling device operated by said key to establish a circuit for the motor when the key is partly depressed and cause the motor to run at slow speed, said controlling device being operable upon a further depression of the key to modify the circuit connections and thereby cause an increase in the speed of the motor.

and means to maintain said controlling device in its operated position independently of the key.

30. In a typewriting machine, the combination of a carriage, a motor, connections from the motor to the carriage for returning the latter to starting position, a resistance, and controlling mechanism operable to establish the motor circuit either through or independently of said resistance and thereby vary the speed of the motor.

31. In a typewriting machine, the combination of a carriage, a motor, connections between the motor and carriage for returning the latter to starting position, a resistance in circuit with the motor, controlling means to establish a circuit through the motor and said resistance to operate the carriage at slow speed, and means to short-circuit said resistance and thereby cause the motor to run at a higher speed.

32. In a typewriting machine, the combination of a carriage, a motor, connections from the motor to the carriage for returning the latter to starting position, a key operable when partly depressed to cause the carriage to return at a reduced speed and when fully depressed to return the carriage at a higher speed, a second key, and means operated by said second key when fully depressed, to operate the first key to said intermediate position.

33. In a typewriting machine, the combination of a carriage, a motor, driving connections between the carriage and motor, a key operable when partly depressed to cause the carriage to return at a given speed and when fully depressed to operate the carriage at a different speed, and a second key operable when fully depressed to operate the first key to said partly-depressed position.

34. In a typewriting machine, the combination of a carriage, a motor, driving connections therebetween, a controlling key operable to cause the carriage to operate with a variable speed dependent on the extent to which said key is operated, and a second key having a locking engagement with the first key and operable to operate said first key through a portion only of its range of movement.

35. In a typewriting machine, the combination of a motor, a carriage, connections from the motor to the carriage to return the latter to starting position, a key controlling the motor to return the carriage at full speed, a second key to operate said first key, and means to limit the range of movement of the first key when operated by the second key and thereby cause the motor to run at a reduced speed.

36. In a typewriting machine, the combination of a carriage, a motor, connections between the motor and carriage for returning the latter to starting position, a key controlling the operation of the motor, a second key controlling the operation of the motor, and means operated by said second key to stop the carriage at an intermediate position in its return movement.

37. In a typewriting machine, the combination of a motor, a carriage, operating connections therebetween, a key controlling the motor to permit a return of the carriage to starting position, a second key controlling the motor, and means operated by said second key to stop the carriage at an intermediate position in its return movement.

38. In a typewriting machine, the combination of a motor, a carriage, connections between the motor and carriage for returning the latter to starting position, a key controlling the motor and permitting the full return of the carriage, a second key controlling the motor, a stop operated thereby, and a coöperating stop on the carriage in position to stop the carriage before it has been returned to starting position.

39. In a typewriting machine, the combination of a motor, a carriage, a connection between the motor and carriage for returning the carriage to starting position, a margin stop, a key controlling said stop, and means operated by said key to control the motor.

40. In a typewriting machine, the combination of a carriage, a motor, driving connections from the motor to the carriage for returning the latter to starting position, a key, a stop operated thereby into position to stop the carriage for a paragraph indentation, means operated by said key to control the motor, and additional means for controlling the motor to effect a full return of the carriage.

41. In a typewriting machine, the combination of a motor, a carriage, a driving connection from the motor to the carriage, a key, means operated thereby to supply power to the motor and cause a full return of the carriage, a second key controlling the supply of power to the motor, and means operated by said second key to stop the carriage at a paragraph indentation position.

42. In a typewriting machine, the combination of a motor, a carriage, a driving connection between the motor and the carriage for returning the latter to starting position, a key controlling the motor for effecting the return of the carriage at full speed, a second key, means operated thereby to cause the carriage to operate at a reduced speed, and a stop operated by said second key to limit the return movement of the carriage.

43. In a typewriting machine, the combination of a motor, a carriage, a connection between the motor and the carriage for returning the latter to starting position, a key operable to effect a full return of the carriage at full speed, a second key to effect a full return of the carriage at a reduced speed, and a third key to effect the return of the carriage at a reduced speed to an intermediate position.

44. In a typewriting machine, the combination of a motor, a carriage, a connection from the motor to the carriage for returning the carriage to its starting position, means controlling the operation of the motor, a key, a plunger operated by the key, a stop carried by said plunger, and a coöperating stop on the carriage in position to engage said first-named stop and prevent a full return of the carriage.

45. In a typewriting machine, the combination of a motor, a carriage, a connection from the motor to the carriage for returning the latter to starting position, a key controlling the motor to effect the return of the carriage, a second key also controlling the motor, a plunger actuated by said second key, a stop carried by the plunger, and means on the carriage to engage said stop when the latter is in operative position and thereby limit the return movement of the carriage.

46. In a typewriting machine, the combination of an electric motor, a carriage, a driving connection from the motor to the carriage, a key lever, a plunger adapted to be operated by said lever, an adjustable stop carried by the plunger, a coöperating stop on the carriage, and a circuit closer operated by said key lever.

47. In a typewriting machine, the combination of an electric motor, a carriage, a drum connected to the motor shaft, a line-space lever, a belt connected to said lever and winding on said drum, a resistance, a finger lever, means operated thereby to establish a circuit for the motor independently of said resistance for returning the carriage, a switch to establish a circuit through the motor and said resistance for operating the motor with a reduced torque, and means for automatically closing said switch when the line-space lever is operated to manually return the carriage.

BENJAMIN F. HUTCHES, Jr.

Witnesses:
 PAUL ZIRON,
 C. RIPLEY.